US 8,465,703 B2

(12) United States Patent
Tsuji et al.

(10) Patent No.: US 8,465,703 B2
(45) Date of Patent: Jun. 18, 2013

(54) FILTER CATALYST AND METHOD OF ANALYZING A CATALYTIC LAYER THEREOF

(75) Inventors: Makoto Tsuji, Kakegawa (JP); Daisuke Oki, Kakegawa (JP); Juji Suzuki, Toyota (JP)

(73) Assignees: Cataler Corporation, Shizuoka (JP); Toyota Jidosha Kabushiki Kaisha, Toyota (JP)

( * ) Notice: Subject to any disclaimer, the term of this patent is extended or adjusted under 35 U.S.C. 154(b) by 1689 days.

(21) Appl. No.: 10/568,429

(22) PCT Filed: Feb. 10, 2005

(86) PCT No.: PCT/JP2005/002530
§ 371 (c)(1),
(2), (4) Date: Feb. 14, 2006

(87) PCT Pub. No.: WO2005/075052
PCT Pub. Date: Aug. 18, 2005

(65) Prior Publication Data
US 2007/0003456 A1 Jan. 4, 2007

(30) Foreign Application Priority Data
Feb. 10, 2004 (JP) .................................. 2004-033918

(51) Int. Cl.
*B01D 50/00* (2006.01)
*G06K 9/00* (2006.01)
(52) U.S. Cl.
USPC .......................................... 422/177; 382/141
(58) Field of Classification Search
USPC .......................................... 422/168, 177, 180
See application file for complete search history.

(56) References Cited

U.S. PATENT DOCUMENTS 3,959,520 A * 5/1976 Hoyer et al. ..................... 427/8
5,459,119 A * 10/1995 Abe et al. ..................... 502/326
(Continued)

FOREIGN PATENT DOCUMENTS

EP 1 398 081 A1 3/2004
JP A 09-173866 7/1997
(Continued)

OTHER PUBLICATIONS

Jul. 20, 2010 European Office Action issued in European Patent Application No. 05 710 376.4.

*Primary Examiner* — Tom Duong
(74) *Attorney, Agent, or Firm* — Oliff & Berridge, PLC

(57) ABSTRACT

To provide a filter catalyst in which the closure of ventilation holes by a catalytic layer is inhibited.
A filter catalyst of the present is characterized in that, in a filter catalyst comprising: a catalyst-support substrate; and a catalytic layer; an SEM photograph on a cross section of the filter catalyst is turned into electronic data so that, in a processed image in which image processing is performed to the SEM photograph, a ratio of a number of pixels forming an outer periphery of the catalytic layer to a number of pixels forming the catalytic layer is 0.5 or more. An analyzing method of the present invention finds a ratio a number of pixels forming an outer periphery of the catalytic layer to a number of pixels forming the catalytic layer by performing image processing to a cross section of the filter catalyst. The filter catalyst of the present invention has an effect of being capable of inhibiting the rise of pressure loss when sufficient particulates deposit. Moreover, the analyzing method of the present invention can analyze the uniformity of the catalytic layer of the filter catalyst.

8 Claims, 9 Drawing Sheets

U.S. PATENT DOCUMENTS

| | | |
|---|---|---|
| 2003/0024220 A1 | 2/2003 | Ishihara et al. |
| 2003/0050196 A1 | 3/2003 | Hirano et al. |
| 2003/0165662 A1 | 9/2003 | Suwabe et al. |
| 2003/0166450 A1 | 9/2003 | Kumazawa et al. |
| 2004/0053781 A1 | 3/2004 | Okawara |

FOREIGN PATENT DOCUMENTS

| | | |
|---|---|---|
| JP | A 09-220423 | 8/1997 |
| JP | A 09-276708 | 10/1997 |
| JP | A 2002-295228 | 10/2002 |
| JP | A 2002-361047 | 12/2002 |
| JP | A 2003-040687 | 2/2003 |
| JP | A 2003-120256 | 4/2003 |
| JP | A-2003-211001 | 7/2003 |
| JP | A-2003-227329 | 8/2003 |
| JP | A 2003-236322 | 8/2003 |
| JP | A-2003-326162 | 11/2003 |
| JP | A 2004-105792 | 4/2004 |

\* cited by examiner

Catalyst-support Substrate   Catalytic Layer

FILTER CATALYST AND METHOD OF ANALYZING A CATALYTIC LAYER THEREOF

TECHNICAL FIELD

The present invention relates to a filter catalyst which removes particulates at least, particulates which are one of substances included in exhaust gases emitted from internal combustion engines, such as diesel engines, to purify the exhaust gases.

BACKGROUND ART

In exhaust gases which are emitted from internal combustion engines, such as diesel engines, particulates are included. In the particulates, substances which are harmful to human bodies are included, and it has become an environmental assignment to remove them.

For removing the particulates, filter catalysts have been used. Filter catalysts are set forth in Japanese Unexamined Patent Publication (KOKAI) No. 9-173,866, Japanese Unexamined Patent Publication (KOKAI) No. 9-220,423, Japanese Unexamined Patent Publication (KOKAI) No. 9-276,708 and Japanese Unexamined Patent Publication (KOKAI) No. 2002-295,228, for example. A conventional filter catalyst has a construction in which a catalytic layer comprising a loading layer composed of alumina, and the like, and a catalytic metal loaded on the loading layer is formed on a catalyst-support substrate composed of porous ceramic having chained pores. And, when exhaust gases pass the ventilation holes formed out of the chained pores of the catalyst-support substrate, the filter catalyst captures the particulates. The catalytic layer decomposes the captured particulates. At this moment, if the ventilation holes are not formed in the filter catalyst to the extent that the exhaust gases pass, the captured particulates deposit to close the ventilation holes so that the pressure loss increases when the exhaust gases pass. When the opening diameters of the ventilation holes are enlarged in order to reduce the pressure loss, it has become impossible to capture the particulates.

The conventional filter catalyst has a problem in that the catalytic layer, formed on the catalytic-support substrate, has narrowed down the opening diameters of pores so that the ventilation holes have come not to have sufficient opening diameters or the ventilation holes have come not to be opened (have been closed). Specifically, the catalytic layer of the filter catalyst is produced by preparing a slurry in which particles, such as alumina, are dispersed, coating this slurry onto a catalyst-support substrate, drying-calcining it to form a loading layer, and thereafter loading a catalytic metal thereon. During the application of the slurry onto the catalyst-support substrate, since the slurry does not penetrate deep inside the pores of the catalyst-support substrate sufficiently, it is present adjacent to the opening of the pores of the catalyst-support substrate in a deviated manner. Since the catalytic layer is formed by drying-calcining it in this state, the diametric reduction or closure of the opening of the ventilation holes occurs so that it has become impossible to form sufficient ventilation holes as a filter catalyst.

DISCLOSURE OF THE INVENTION

The present invention has been done in view of the aforementioned circumstances, and it is an assignment to provide a filter catalyst in which the closure of the ventilation holes by the catalytic layer is inhibited.

The inventors of the present invention inquired into filter catalysts over and over again, as a result, they found out that it is possible to solve the aforementioned assignment by making a ratio of an outer peripheral length of a catalytic layer to a cross-sectional area thereof 0.5 or more in a cross section of a filter catalyst in which a catalytic layer is formed on a catalyst-support substrate.

A filter catalyst of the present invention is characterized in that, in a filter catalyst comprising: a catalyst-support substrate composed of a heat-resistant porous structure having chained pores; and a catalytic layer for burning particulates, the catalytic layer formed on a surface of the catalyst-support substrate; an SEM photograph on a cross section of the filter catalyst is turned into electronic data so that, in an image being turned into electronic data, a ratio of a number of pixels forming an outer periphery of the catalytic layer to a number of pixels forming the catalytic layer is 0.5 or more.

The image being turned into the electronic data can preferably be an image with 1-to-3-μm/pixel magnification.

Moreover, in a method for analyzing a state of a catalytic layer of a filter catalyst, the catalyst comprising: a catalyst-support substrate composed of a heat-resistant porous structure having chained pores; and a catalytic layer for burning particulates, the catalytic layer formed on a surface of the catalyst-support substrate, a method of the present invention is characterized in that an SEM photograph on a cross section of the filter catalyst is turned into electronic data so that, in an image being turned into electronic data, a coated state is analyzed from a ratio of a number of pixels forming an outer periphery of the catalytic layer to a number of pixels forming the catalytic layer.

The image being turned into the electronic data can preferably be an image with 1-to-3-μm/pixel magnification.

BEST MODE FOR CARRYING OUT THE INVENTION

Hereinafter, regarding inventions which further concretize said invention and the embodiment modes of these inventions, they will be described.

Mode for Carrying out the Invention

Filter Catalyst

A filter catalyst of the present invention comprises a catalytic-support substrate, and a catalytic layer.

The catalyst-support substrate is composed of a heat-resistant porous structure which has chained pores. Ventilation holes, through which exhaust gases pass, are formed out of the continues pores of the catalyst-support substrate.

The catalytic layer is formed on a surface of the catalyst-support substrate, captures particulates, and at the same time burns the captured particulates. Since the catalytic layer captures particulates and burns them, it is possible to remove particulates in exhaust gases.

The filter catalyst of the present invention is such that an SEM photograph on a cross section of the filter catalyst is taken so that, in a processed image in which the SEM photograph is turned into electronic data, a ratio of a number of pixels forming an outer periphery of the catalytic layer to a number of pixels forming the catalytic layer is 0.5 or more. That is, a ratio of an outer-periphery length of the catalytic layer in the cross section of the filter catalyst to a cross-sectional area of the catalytic layer is 0.5 or more. Note that the outer periphery of the catalytic layer in the cross section of the filter catalyst includes not only the surface of the catalytic layer but also the interface between the catalytic layer and the catalyst-support substrate. When the ratio of an outer-periphery length of the catalytic layer to a cross-sectional area of the catalytic layer becomes 0.5 or more, the catalytic layer is formed on the surface of the catalyst-support substrate uniformly so that deviation comes not to arise in the thickness of the catalytic layer. When the ratio of an outer-periphery length of the catalytic layer to a cross-sectional area of the catalytic layer becomes less than 0.5, the catalytic layer closes the pores of the catalyst-support substrate or forms ventilation holes free of having sufficient opening diameters, or the catalyst-support substrate comes to be exposed with no catalytic layer being formed, so that not only pressure loss enlarges but also a contacting area with PM becomes smaller to degrade the purifying performance of PM, when being used as a filter catalyst.

Figure 1:
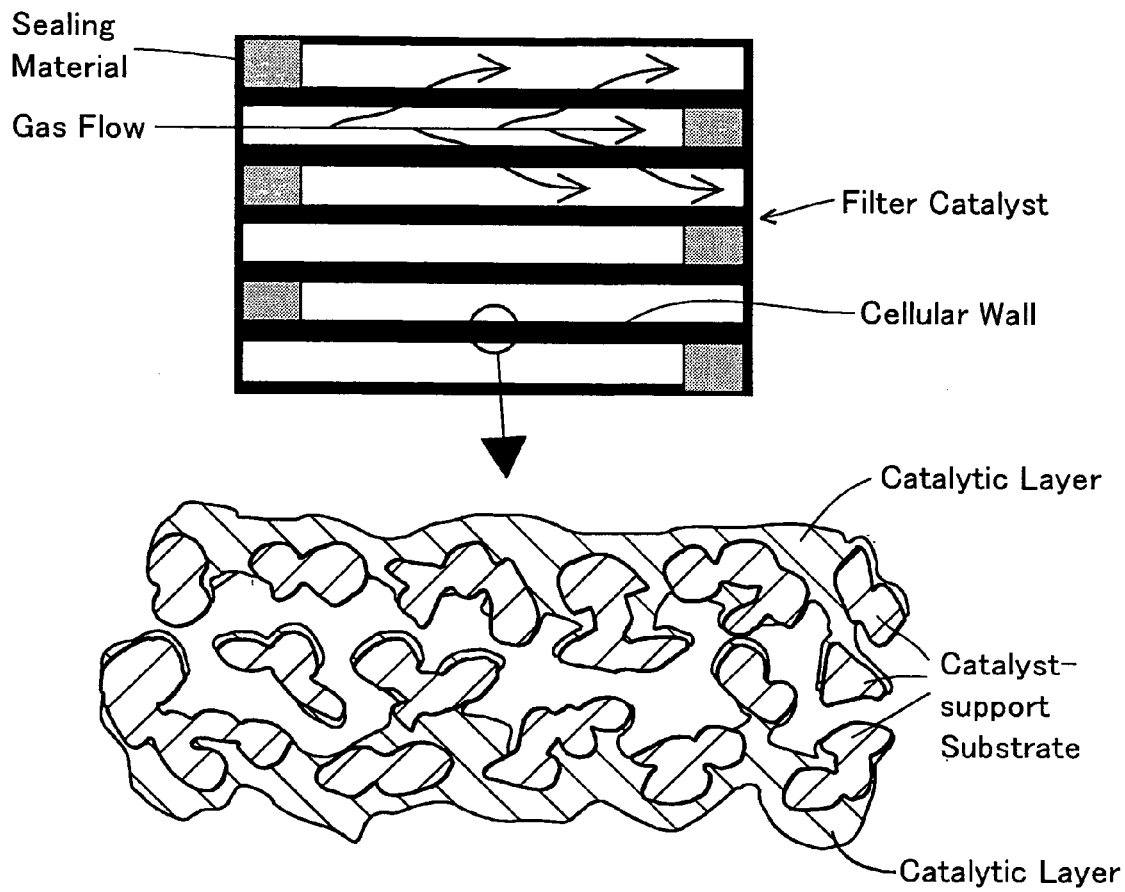
FIG. 1 is an enlarged cross-sectional diagram of a filter catalyst in which unevenness is present in the catalytic layer.
Figure 2:
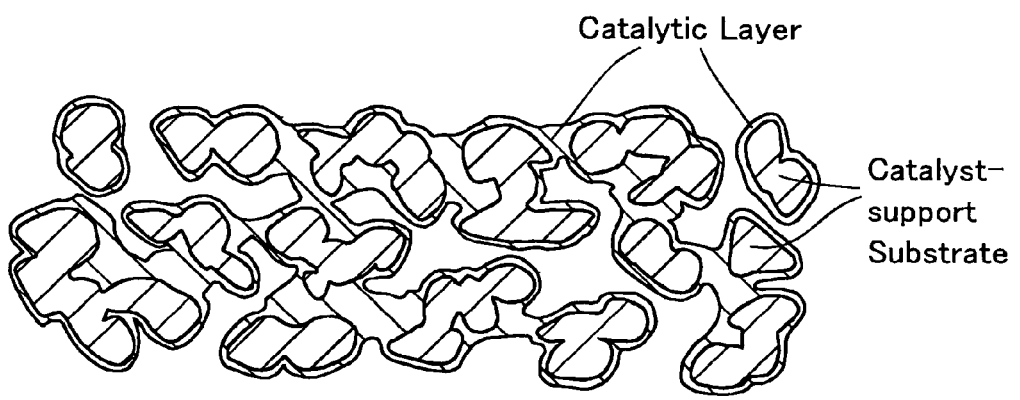
FIG. 2 is an enlarged cross-sectional diagram of a filter catalyst in which unevenness is present in the catalytic layer.
Figure 3:
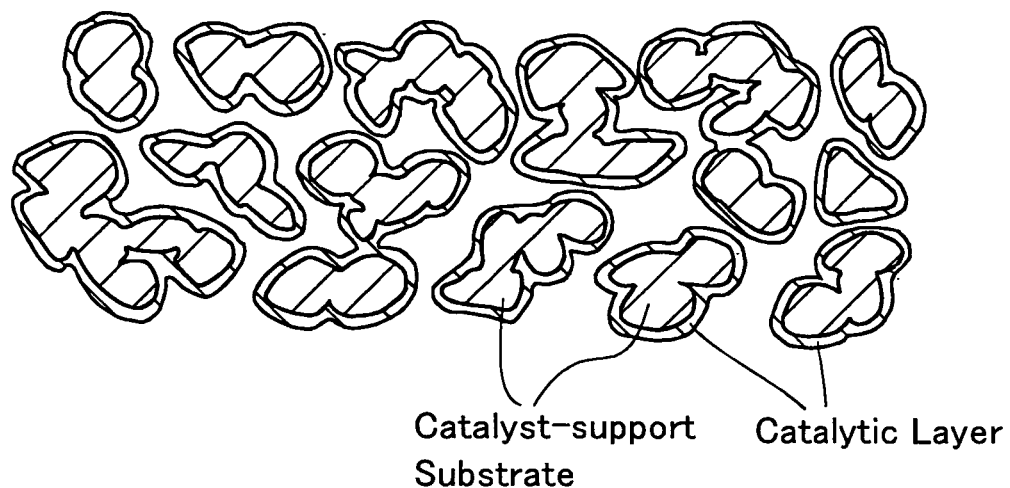
FIG. 3 is an enlarged cross-sectional diagram of a filter catalyst of the present invention.

In general, in figures with the same area, the flatter the shape of figures becomes (being flattened), the larger the outer-periphery length/area ratio becomes. Figures with the smallest outer-periphery length/area ratio are circles. And, when this fact is applied to the cross section of a catalytic layer of a filter catalyst, the cross-sectional area of the catalytic layer corresponds to the area of a figure, and the outer-periphery length of the figure corresponds to the outer-periphery length of the catalytic layer. Since the catalytic layer is formed on a catalyst-support substrate in a sufficient amount for burning captured particulates in the filter catalyst, it comes to have a certain cross-sectional area or more. And, when the catalytic layer on the surface of the catalyst-support substrate comes to have a certain cross-sectional area, if the catalytic layer's outer-periphery length/area ratio becomes smaller (if the outer-periphery length of the catalytic layer becomes shorter), the thickness of the catalytic layer in the surface of the catalytic-support substrate becomes thicker so that the catalytic layer reaches the wall surfaces of the facing pores of the catalyst-support substrate to come to close the pores of the catalyst-support substrate (the states illustrated in FIGS. 1 and 2). On the contrary, if the catalytic layer's outer-periphery length/area ratio becomes larger (if the outer-periphery length of the catalytic layer becomes longer), the thickness of the catalytic layer in the surface of the catalytic-support substrate becomes thinner so that a covering area, which covers the surface of the catalyst-support substrate, increases. And, if the catalytic layer's outer-periphery length/area ratio becomes 0.5 or more, the catalytic layer comes to be formed uniformly, without exposing the surface of the catalyst-support substrate, on the surface (the state illustrated in FIG. 3). When the catalytic layer is formed uniformly on the surface of the catalyst-support substrate, the filter catalyst comes to have a sufficient catalytic-layer amount, and comes to have ventilation holes with sufficient opening amounts. Note that aforementioned FIGS. 2 and 3 are enlarged diagrams which are similar to the enlarged diagram of FIG. 1 in which the cellular walls of the filter catalyst are enlarged.

The outer-periphery length of the catalytic layer and the area of the catalytic layer in a cross-section of the filter catalyst are such that an SEM photograph on a cross section of the filter catalyst is turned into electronic data to find them from a number of pixels in the image. By obtaining the catalytic layer's outer-periphery length and area in a cross section of the filter catalyst from the SEM photograph, it is possible to find the catalytic layer's ratio of outer-periphery length to area. Note that the SEM photograph being turned into electronic data, to which image processing is performed, can be such that a method of retrieving the printed SEM photograph with a scanner is used, or photographed data are turned into electronic data directly to use.

The number of pixels can preferably be measured with 1-to-3-μm/pixel magnification, more preferably with 1.6-to-2-μm/pixel magnification.

As far as the filter catalyst of the present invention comprises a catalyst-support substrate and a catalytic layer, and comprises the aforementioned arrangement, the material and production process are not limited in particular.

The catalyst-support substrate can use substrates which have been used as catalyst-support substrates in the conventional filter catalysts. For example, it is possible to use wall-flow DPF (diesel particulates filter), which is composed of cordierite, SiC and the other heat-resistant ceramic, ceramic foam filters, and metallic nonwoven-cloth DPF.

The catalytic layer is not limited in particular, as far as the filter catalyst can burn captured particulates. The catalytic layer can preferably comprise a loading layer, composed of a heat-resistant inorganic oxide, and a catalytic metal, loaded on the loading layer.

As for the heat-resistant inorganic oxide forming the loading layer, it is possible to name one or more members selected from the group consisting of transition metal oxides, such as $Al_2O_3$, $SiO_2$, $TiO_2$, $ZrO_2$ and $CeO_2$, rare-earth element oxides, alkali metal oxides, alkaline-earth metal oxides, and composite oxide of these. Moreover, as for the catalytic metal, it is possible to name at least one member selected from precious metals, such as Pt, Pd, Rh, Ir, Ag and Au.

The filter catalyst of the present invention can be produced by the following production process, for instance.

First of all, a slurry was prepared from an oxide, which became a raw material for the loading layer. In this instance, the oxide constituting the slurry was prepared so that particles whose particle diameters were 1 μm or less became 70% by weight or more when the entire amount of the oxide was taken as 100% by weight.

This slurry was coated onto the catalyst-support substrate. The coating amount (oxide conversion) per 1-litter (apparent) volume of the catalyst-support substrate can preferably be 150 g or less when particles whose particle diameters are 1 μm or less is 70-90% by weight; when they exceed 90% by weight, it can preferably be 200 g or less. The coating amount of the slurry was found from the weights before and after the coating.

The coating of the slurry onto the catalyst-support substrate was done by removing the slurry in excess after applying the slurry onto the catalyst-support substrate and calcining it after drying the slurry. The loading layer was formed by the coating of the slurry. Subsequently, it was immersed into a catalytic-metal aqueous solution, and was calcined to load the catalytic metal.

In accordance with the above procedures, it is possible to produce the filter catalyst of the present invention.

Analyzing Method of Catalytic Layer of Filter Catalyst

The method of the present invention of analyzing a catalytic layer of a filter catalyst is a method of analyzing a catalytic layer of a filter catalyst, method which analyzes a state of a catalytic layer of a filter catalyst comprising: a catalyst-support substrate composed of a heat-resistant porous structure having chained pores; and a catalytic layer for burning particulates, the catalytic layer formed on a surface of the catalyst-support substrate. And, an SEM photograph on a cross section of the filter catalyst is turned into electronic data so that, in an image being turned into electronic data, a coated state is analyzed from a ratio of a number of pixels forming an outer periphery of the catalytic layer to a number of pixels forming the catalytic layer.

As set forth above, in the filter catalyst, the thickness uniformity of the catalytic layer, which is formed on the catalyst-support substrate, exhibits a high correlation to the purifying performance of the filter catalyst. That is, it has been required that the thickness uniformity of the catalytic layer be high.

And, as set forth above, the thickness uniformity of the catalytic layer can be defined by the outer-periphery length/area ratio in a cross-section of the catalytic layer. When the catalytic layer's outer-periphery length/area ratio becomes smaller (when the outer-periphery length of the catalytic layer becomes shorter), the thickness of the catalytic layer in the surface of the catalytic-support substrate becomes thicker so that the thickness uniformity of the catalytic layer degrades. When the catalytic layer's outer-periphery length/area ratio becomes larger (when the outer-periphery length of the catalytic layer becomes longer), the thickness of the catalytic layer in the surface of the catalytic-support substrate becomes thinner so that a covering area, which covers the surface of the catalyst-support substrate, increases so that the thickness uniformity of the catalytic layer improves.

The outer-periphery length of the catalytic layer and the area of the catalytic layer in a cross-section of the filter catalyst are such that an SEM photograph on a cross section of the filter catalyst is turned into electronic data to find them from a number of pixels in the image. By obtaining the catalytic layer's outer-periphery length and area in a cross section of the filter catalyst from the SEM photograph, it is possible to find the catalytic layer's ratio of outer-periphery length to area. Note that the SEM photograph being turned into electronic data, to which image processing is performed, can be such that a method of retrieving the printed SEM photograph with a scanner is used, or photographed data are turned into electronic data directly to use.

The number of pixels can preferably be measured with 1-to-3-μm/pixel magnification, more preferably with 1.6-to-2-μm/pixel magnification.

EXAMPLES

Hereinafter, the present invention will be described using examples.

As an example of the present invention, a production of a filter catalyst was carried out.

Example No. 1

First of all, 750-g alumina ($Al_2O_3$) powder, 750-g titania ($TiO_2$) powder and 2,000-g water were weighed, a mixture powder composed of both powders was charged into the water, was dispersed therein by stirring, and was subjected to wet milling, thereby preparing a slurry. When the entire mixture powder was taken as 100% by weight, particles whose particle diameters were 1 μm or less became 77%.

Figure 4:
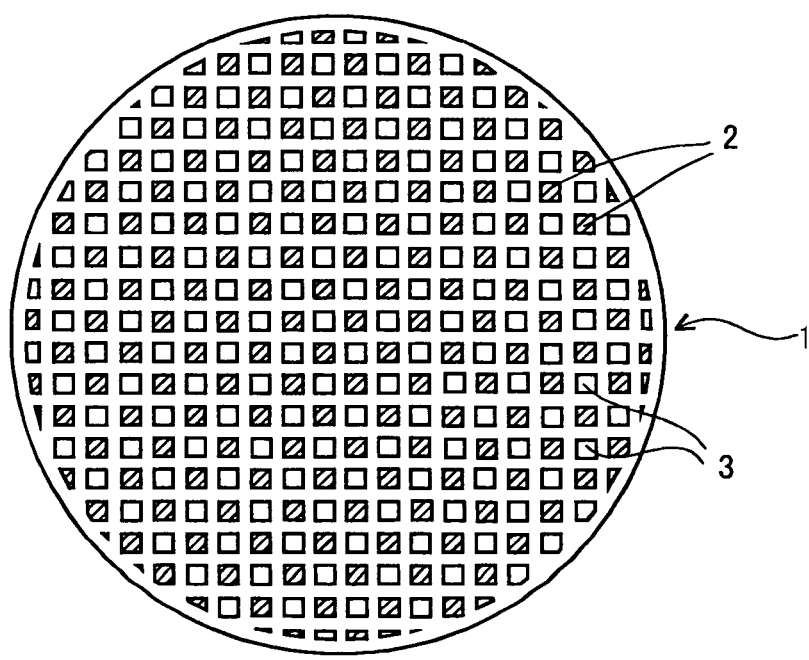
FIG. 4 is a top-surface diagram for illustrating an opposite end-surface of a catalyst-support substrate.

Subsequently, the slurry was coated on a catalyst-support substrate. The catalyst-support substrate is a catalyst-support substrate (produced by DENSO) which has axially-extending cells demarcated by cellular walls whose thickness is 300 μm in a quantity of 48 cells/$cm^2$ (about 300 cells/$inch^2$), which is formed as a cylinder shape substantially, whose apparent volume is 2 liters, and which is made of cordierite. This catalyst-support substrate 1 is such that one of the two openings, which are formed at the both opposite ends of the respective cells, is sealed alternately with a sealing material. That is, about half of the large number of the cells are opened in one of the opposite end-surfaces, and the rest of them are opened in the other one of the opposite end-surfaces. In the opposite end-surfaces of the catalyst-support substrate, the sealed cells 2 and the opened cells 3 are lined up alternately. Therefore, the opposite end-surfaces of the catalyst-support substrate become like checkered patterns. An opposite end-surface of the catalyst-support substrate is illustrated in FIG. 4.

The coating of the slurry onto the catalyst-support substrate was carried out by immersing the catalyst-support substrate into the slurry, removing the excessive slurry after taking it up therefrom, and thereafter drying and calcining it. Note that, in the present example, the removal of the excessive slurry was done by repeating a pressure fluctuation, in which the slurry was suctioned by holding it in such a state that one of the opposite ends was adapted to the atmospheric pressure and the other one of the opposite ends was adapted to a pressure of (the atmospheric pressure—10 KPa) so that the pressure difference between both opposite ends became 10 KPa for 5-30 seconds; and thereafter holding it for 5-30 seconds after putting the pressure of the other one of the opposite ends back to the atmospheric pressure. This pressure fluctuation was repeated until the slurry applied on the catalyst-support substrate became a predetermined weight. Note that, during the production of the present example, since the suction of the slurry was carried out through the respective opposite-end sides of both opposite ends, the pressure fluctuation was done twice. Moreover, the calcination was carried out by heating it at 500° C. for 1 hour.

When the weight of the catalyst-support substrate with the slurry coated was weighed, it was increased by 300 g more than prior to the coating of the slurry. That is, the loading layer was formed in a loading amount of 150 g per 1-liter apparent volume of the catalyst-support substrate. The alumina and titania were loaded in a loading amount of 75 g per 1-liter apparent volume of the catalyst-support substrate, respectively.

And, a Pt nitrate aqueous solution including Pt in an amount of 1.5 g/L was prepared, and the catalyst-support substrate with the slurry coated was immersed into it, and was dried and calcined after taking it up therefrom. The calcining was carried out by heating it at 500° C. for 1 hour. The Pt was loaded in a loading amount of 3 g per 1-liter apparent volume of the catalyst-support substrate.

In accordance with the above procedures, a filter catalyst of Example No. 1 was produced.

Example No. 2

Except that the oxide of the slurry was titania alone and was adapted to 150 g, a filter catalyst of the present example was produced in the same manner as Example No. 1.

First of all, 1,500-g titania powder and 2,000-g water were weighed, the titania powder was charged into the water, was dispersed therein by stirring, and was subjected to wet milling, thereby preparing a slurry. When the entire titania powder was taken as 100% by weight, particles whose particle diameters were 1 μm or less became 75%.

The slurry was coated onto the same catalyst-support substrate as the one used in Example No. 1. The coating of the slurry onto the catalyst-support substrate was carried out by immersing the catalyst-support substrate into the slurry, removing the excessive slurry after taking it up therefrom, and thereafter drying and calcining it. Note that, in the present example, the removal of the excessive slurry was done by repeating a pressure fluctuation, in which the slurry was suctioned by holding it in such a state that one of the opposite ends was adapted to the atmospheric pressure and the other one of the opposite ends was adapted to a pressure of (the atmospheric pressure—10 KPa) so that the pressure difference between both opposite ends became 10 KPa for 5-30 seconds; and thereafter holding it for 5-30 seconds after putting the pressure of the other one of the opposite ends back to the atmospheric pressure. This pressure fluctuation was repeated until the slurry applied on the catalyst-support substrate became a predetermined weight. Note that, during the production of the present example, the pressure fluctuation was done twice similarly to the instance of Example No. 1. Moreover, the calcination was carried out by heating it at 500° C. for 1 hour.

When the weight of the catalyst-support substrate with the slurry coated was weighed, it was increased by 300 g more than prior to the coating of the slurry. That is, the titania was loaded in a loading amount of 150 g per 1-liter apparent volume of the catalyst-support substrate.

And, a Pt nitrate aqueous solution including Pt in an amount of 1.5 g/L was prepared, and the catalyst-support substrate with the slurry coated was immersed into it, and was dried and calcined after taking it up therefrom. The calcining was carried out by heating it at 500° C. for 1 hour. The Pt was loaded in a loading amount of 3 g per 1-liter apparent volume of the catalyst-support substrate.

In accordance with the above procedures, a filter catalyst of Example No. 2 was produced.

Example No. 3

Except that the oxide of the slurry was alumina alone and was adapted to 1,500 g, a filter catalyst of the present example was produced in the same manner as Example No. 1.

First of all, 1,500-g alumina powder and 2,000-g water were weighed, the alumina powder was charged into the water, was dispersed therein by stirring, and was subjected to wet milling, thereby preparing a slurry. When the entire alumina powder was taken as 100% by weight, particles whose particle diameters were 1 μm or less became 75%.

The slurry was coated onto the same catalyst-support substrate as the one used in Example No. 1. The coating of the slurry onto the catalyst-support substrate was carried out by immersing the catalyst-support substrate into the slurry, removing the excessive slurry after taking it up therefrom, and thereafter drying and calcining it. Note that, in the present example, the removal of the excessive slurry was done by repeating a pressure fluctuation, in which the slurry was suctioned by holding it in such a state that one of the opposite ends was adapted to the atmospheric pressure and the other one of the opposite ends was adapted to a pressure of (the atmospheric pressure—10 KPa) so that the pressure difference between both opposite ends became 10 KPa for 5-30 seconds; and thereafter holding it for 5-30 seconds after putting the pressure of the other one of the opposite ends back to the atmospheric pressure. This pressure fluctuation was repeated until the slurry applied on the catalyst-support substrate became a predetermined weight. Note that, during the production of the present example, the pressure fluctuation was done twice similarly to the instance of Example No. 1. Moreover, the calcination was carried out by heating it at 500° C. for 1 hour.

When the weight of the catalyst-support substrate with the slurry coated was weighed, it was increased by 300 g more than prior to the coating of the slurry. That is, the alumina was loaded in a loading amount of 150 g per 1-liter apparent volume of the catalyst-support substrate.

And, a Pt nitrate aqueous solution including Pt in an amount of 1.5 g/L was prepared, and the catalyst-support substrate with the slurry coated was immersed into it, and was dried and calcined after taking it up therefrom. The calcining was carried out by heating it at 500° C. for 1 hour. The Pt was loaded in a loading amount of 3 g per 1-liter apparent volume of the catalyst-support substrate.

In accordance with the above procedures, a filter catalyst of Example No. 3 was produced.

Example No. 4

First of all, 750-g alumina powder, 750-g titania powder and 2,000-g water were weighed, a mixture powder composed of both powders was charged into the water, was dispersed therein by stirring, and was subjected to wet milling, thereby preparing a slurry. When the entire mixture powder was taken as 100% by weight, particles whose particle diameters were 1 μm or less became 94%.

The slurry was coated onto the same catalyst-support substrate as the one used in Example No. 1. The coating of the slurry onto the catalyst-support substrate was carried out by immersing the catalyst-support substrate into the slurry, removing the excessive slurry after taking it up therefrom, and thereafter drying and calcining it. Note that, in the present example, the removal of the excessive slurry was done by repeating a pressure fluctuation, in which the slurry was suctioned by holding it in such a state that one of the opposite ends was adapted to the atmospheric pressure and the other one of the opposite ends was adapted to a pressure of (the atmospheric pressure—10 KPa) so that the pressure difference between both opposite ends became 10 KPa for 5-30 seconds; and thereafter holding it for 5-30 seconds after putting the pressure of the other one of the opposite ends back to the atmospheric pressure. This pressure fluctuation was repeated until the slurry applied on the catalyst-support substrate became a predetermined weight. Note that, during the production of the present example, the pressure fluctuation was done twice similarly to the instance of Example No. 1. Moreover, the calcination was carried out by heating it at 500° C. for 1 hour.

When the weight of the catalyst-support substrate with the slurry coated was weighed, it was increased by 400 g more than prior to the coating of the slurry. That is, the oxides were loaded in a loading amount of 200 g per 1-liter apparent volume of the catalyst-support substrate. In this instance, the alumina and titania were loaded in a loading amount of 100 g per 1-liter apparent volume of the catalyst-support substrate, respectively.

And, a Pt nitrate aqueous solution including Pt in an amount of 1.5 g/L was prepared, and the catalyst-support substrate with the slurry coated was immersed into it, and was dried and calcined after taking it up therefrom. The calcining was carried out by heating it at 500° C. for 1 hour. The Pt was loaded in a loading amount of 3 g per 1-liter apparent volume of the catalyst-support substrate.

In accordance with the above procedures, a filter catalyst of Example No. 4 was produced.

Comparative Example 750-g alumina powder, 750-g titania powder and 2,000-g water were weighed, a mixture powder composed of both powders was charged into the water, was dispersed therein by stirring, and was subjected to wet milling, thereby preparing a slurry. When the entire mixture powder was taken as 100% by weight, particles whose particle diameters were 1 μm or less became 77%.

Subsequently, the slurry was coated onto the same catalyst-support substrate as the one used in Example No. 1. The coating of the slurry onto the catalyst-support substrate was carried out by immersing the catalyst-support substrate into the slurry, blowing off the excessive slurry after taking it up therefrom, and thereafter drying and calcining it. Note that, in the present example, the blowing-off of the slurry was done by the same method as Example No. 1. Moreover, the calcination was carried out by heating it at 500° C. for 1 hour.

When the weight of the catalyst-support substrate with the slurry coated was weighed, it was increased by 400 g more than prior to the coating of the slurry. That is, the oxides were loaded in a loading amount of 200 g per 1-liter apparent volume of the catalyst-support substrate. In this instance, the alumina and titania were loaded in a loading amount of 100 g per 1-liter apparent volume of the catalyst-support substrate, respectively.

And, a Pt nitrate aqueous solution including Pt in an amount of 1.5 g/L was prepared, and the catalyst-support substrate with the slurry coated was immersed into it, and was dried and calcined after taking it up therefrom. The calcining was carried out by heating it at 500° C. for 1 hour. The Pt was loaded in a loading amount of 3 g per 1-liter apparent volume of the catalyst-support substrate.

In accordance with the above procedures, a filter catalyst of Comparative Example was produced.

Observation of Filter Catalysts

First of all, the filter catalysts of the examples and comparative example were cut axially, and SEM photographs (hundredfold) on cross sections of the cellular walls were taken. In the SEM photographs, 100 μm is enlarged to 1 cm.

Subsequently, the SEM photographs were turned into electronic data using a scanner. The turning of them into electronic data was carried out by actuating a scanner (produced by EPSON, name of article: ES-9000H) with a resolution of 55 pixels per 1 cm (1.8 μm/pixel).

The catalytic layers were extracted by subjecting the SEM photographs, which were turned into electronic data, to image processing. The extraction of the catalytic layers was carried out by digitization by means of brightness. And, the areas of the catalytic layers were measured with the numbers of pixels (the numbers of pixels constituting the catalytic layers were counted).

Subsequently, the outer-periphery contour portions of the catalytic layers were extracted, and the numbers of pixels were measured.

Figure 5:
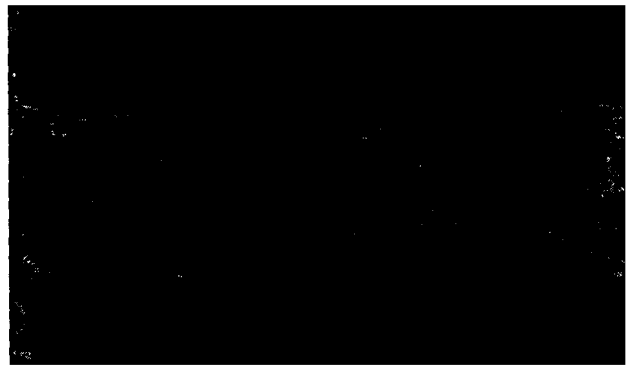
FIG. 5 is an SEM photograph on a filter catalyst of Example No. 1.
Figure 6:
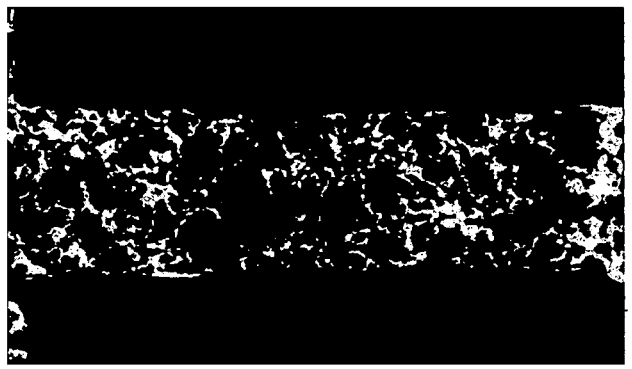
FIG. 6 is a processed image in which a catalytic layer of the filter catalyst of Example No. 1 is extracted.
Figure 7:
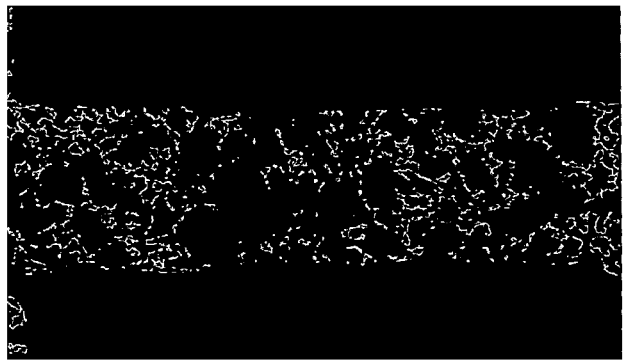
FIG. 7 is a processed image in which an outer-periphery contour portion of the catalytic layer of the filter catalyst of Example No. 1 is extracted.

The SEM photograph of the filter catalyst of Example No. 1, SEM photograph which was turned into electronic data, is shown in FIG. 5, the processed image, in which the catalytic layer was extracted, is shown in FIG. 6, and the processed image, in which the outer-periphery contour portion of the catalytic layer was extracted, is shown in FIG. 7.

Figure 8:
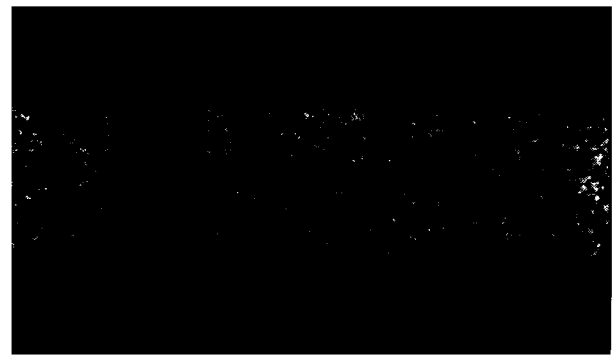
FIG. 8 is an SEM photograph on a filter catalyst of Example No. 2.
Figure 9:
FIG. 9 is a processed image in which a catalytic layer of the filter catalyst of Example No. 2 is extracted.
Figure 10:
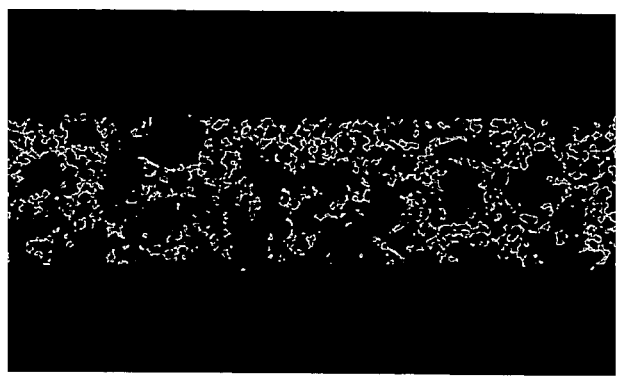
FIG. 10 is a processed image in which an outer-periphery contour portion of the catalytic layer of the filter catalyst of Example No. 2 is extracted.

The SEM photograph of the filter catalyst of Example No. 2, SEM photograph which was turned into electronic data, is shown in FIG. 8, the processed image, in which the catalytic layer was extracted, is shown in FIG. 9, and the processed image, in which the outer-periphery contour portion of the catalytic layer was extracted, is shown in FIG. 10.

Figure 11:
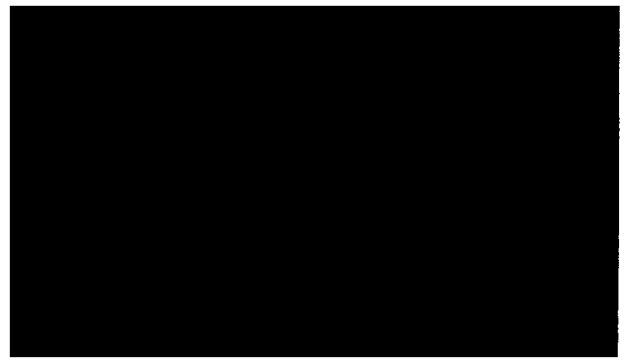
FIG. 11 is an SEM photograph on a filter catalyst of Example No. 3.
Figure 12:
FIG. 12 is a processed image in which a catalytic layer of the filter catalyst of Example No. 3 is extracted.
Figure 13:
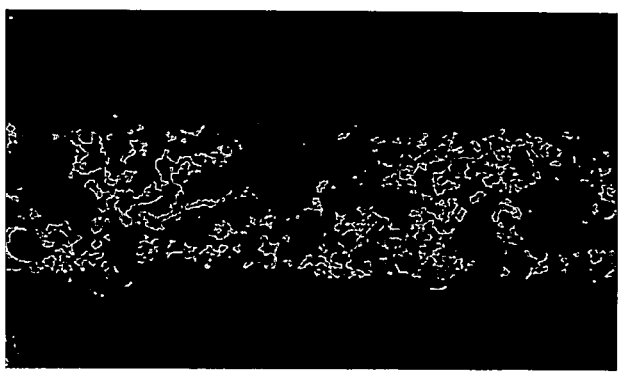
FIG. 13 is a processed image in which an outer-periphery contour portion of the catalytic layer of the filter catalyst of Example No. 3 is extracted.

The SEM photograph of the filter catalyst of Example No. 3, SEM photograph which was turned into electronic data, is shown in FIG. 11, the processed image, in which the catalytic layer was extracted, is shown in FIG. 12, and the processed image, in which the outer-periphery contour portion of the catalytic layer was extracted, is shown in FIG. 13.

Figure 14:
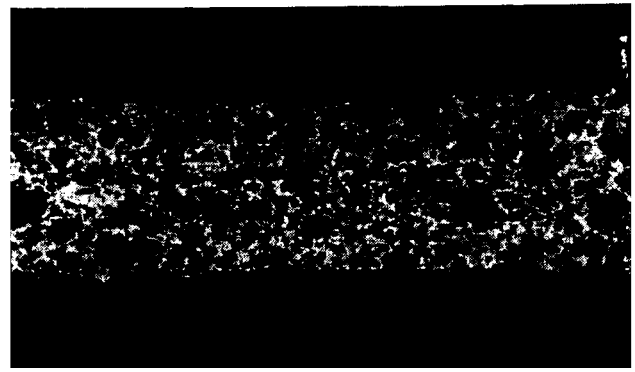
FIG. 14 is an SEM photograph on a filter catalyst of Example No. 4.
Figure 15:
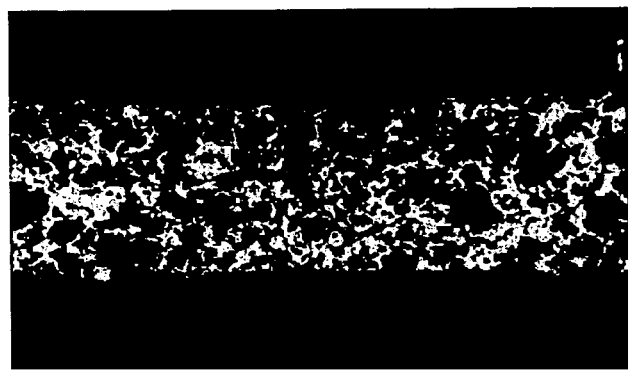
FIG. 15 is a processed image in which a catalytic layer of the filter catalyst of Example No. 4 is extracted.
Figure 16:
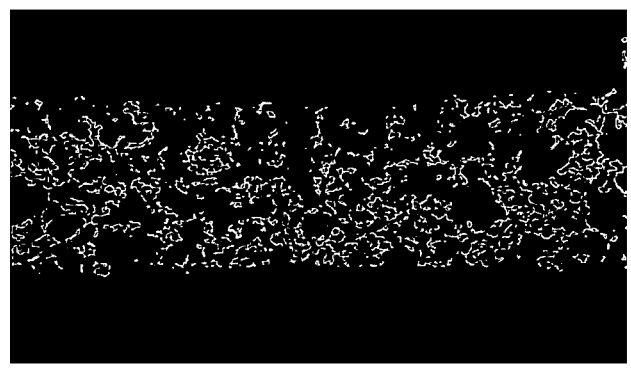
FIG. 16 is a processed image in which an outer-periphery contour portion of the catalytic layer of the filter catalyst of Example No. 4 is extracted.

The SEM photograph of the filter catalyst of Example No. 4, SEM photograph which was turned into electronic data, is shown in FIG. 14, the processed image, in which the catalytic layer was extracted, is shown in FIG. 15, and the processed image, in which the outer-periphery contour portion of the catalytic layer was extracted, is shown in FIG. 16.

Figure 17:
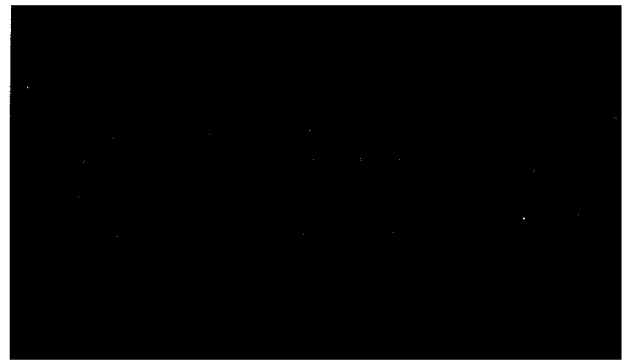
FIG. 17 is an SEM photograph on a filter catalyst of Comparative Example.
Figure 18:
FIG. 18 is a processed image in which a catalytic layer of the filter catalyst of Comparative Example is extracted.
Figure 19:
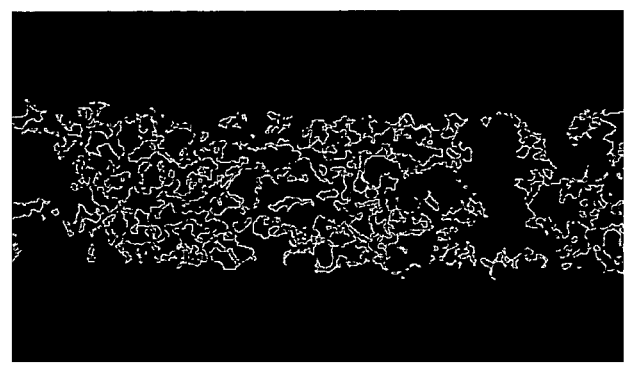
FIG. 19 is a processed image in which an outer-periphery contour portion of the catalytic layer of the filter catalyst of Comparative Example is extracted.

The SEM photograph of the filter catalyst of Comparative Example, SEM photograph which was turned into electronic data, is shown in FIG. 17, the processed image, in which the catalytic layer was extracted, is shown in FIG. 18, and the processed image, in which the outer-periphery contour portion of the catalytic layer was extracted, is shown in FIG. 19.

The measurement results on the numbers of the area and outer-periphery pixels of the catalytic layers are set forth in Table 1. Note that the values expressed by (the number of the outer-periphery contour-portion pixels)/(the number of the catalytic-layer pixels) are set forth in Table 1 as the uniformity of the catalytic layers.

Further, the average pore diameter and porosity of the filter catalysts of examples and comparative example were measured, and are set forth in Table 1 all together. The measurement of the average pore diameter and porosity was carried out, using a mercury porosi-meter (produced by SHIMAZU SEISAKUSHO, name of article: Autopore 9200). Note that the operation of the mercury porosi-meter was carried out by increasing the mercury press-fitting pressure between 0-200 MPa in the measurement of the pore structures.

TABLE 1

| | Catalytic-layer Pixel Number | Catalytic-layer Outer-periphery Pixel Number | Uniformity | Average Pore Diameter (μm) | Porosity (%) |
|---|---|---|---|---|---|
| Ex. No. 1 | 17190 | 10865 | 0.632 | 17.2 | 55.9 |
| Ex. No. 2 | 17927 | 11477 | 0.640 | 19.5 | 54.1 |
| Ex. No. 3 | 17990 | 9521 | 0.535 | 18 | 55 |
| Ex. No. 4 | 23286 | 14481 | 0.622 | 17.5 | 53.2 |
| Comp. Ex. | 29597 | 13258 | 0.448 | 16.3 | 53 |

From Table 1, the filter catalysts of the respective examples exhibit the values of 0.5 or more, values which express the uniformity, however, the uniformity of the filter catalyst of the comparative example becomes such a low value as 0.448. Moreover, it is understood that this uniformity does not depend on the average pore diameter and porosity of the filter catalysts.

Measurement of Pressure Loss

The pressure losses of the filter catalysts of the examples and comparative example were measured.

Figure 20:
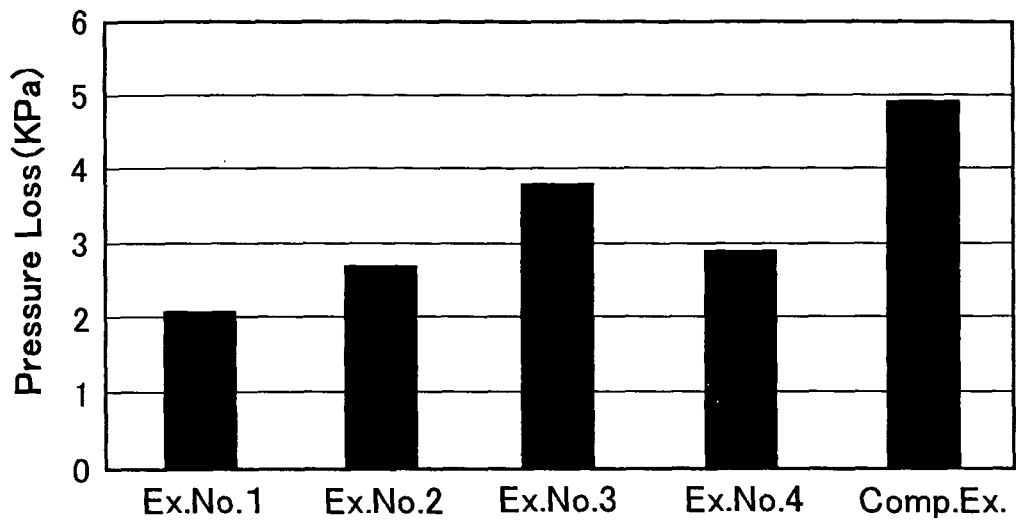
FIG. 20 is a graph for illustrating the measurement results of pressure losses in the filter catalysts.

First of all, the filter catalysts (which were subjected to the pressure-loss measurement) were put into place in an exhaust system of a vehicle which had a 2-liter-displacement turbocharger-type direct-injection diesel engine. In this instance, pressure sensors were installed in front of and at the rear of the filter catalysts of the exhaust system. And, a steady operation was carried out at a revolution speed of 1,800 rpm. The pressure losses were measured from the measurement values of the pressure sensors at the time when particulates were deposited in an amount of about 1 g on the filter catalysts, and the measurement results are illustrated in FIG. 20. The differences between the measurement values of the two pressure sensors were adapted to the pressure losses. Note that the judgement of particulates deposition was done by confirming the weight increase for every 30 minutes in the running time of the engine.

From FIG. 20, the filter catalysts of the respective examples are such that the pressure losses become lower than the filter catalyst of the comparative example. This fact is such that it is understood that the high uniformity of the catalytic layers makes the pressure loss less likely to arise in the filter catalysts in service.

Figure 21:
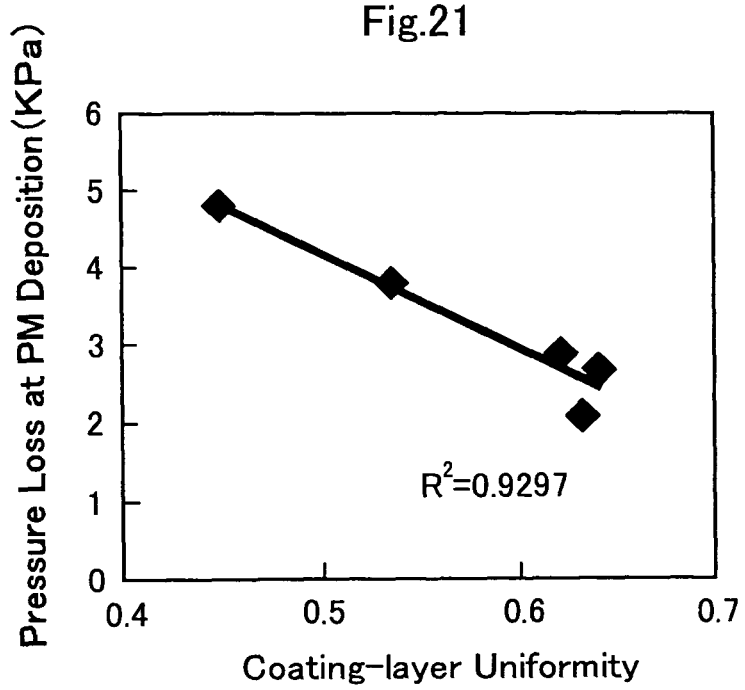
FIG. 21 is a graph for illustrating the relationship between catalytic layer's uniformity and pressure loss.
Figure 22:
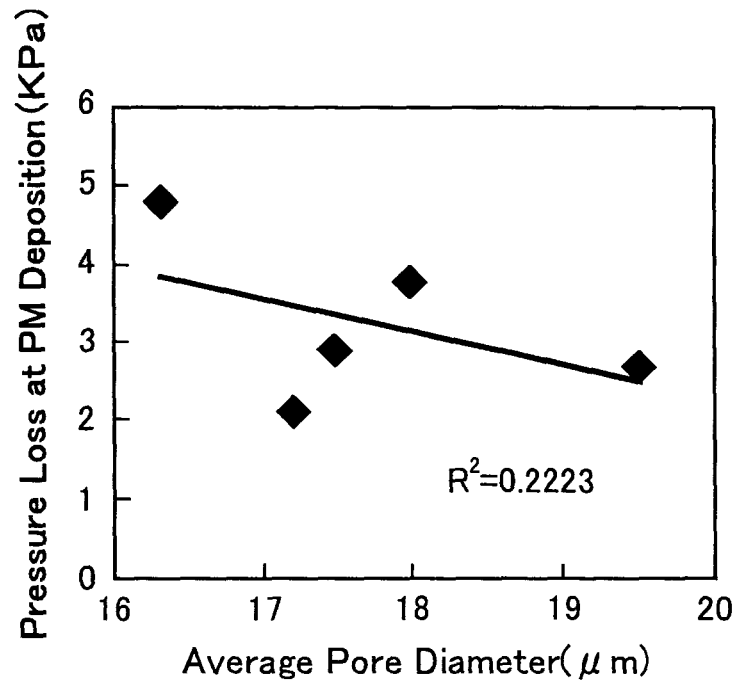
FIG. 22 is a graph for illustrating the relationship between catalytic layer's average pore diameter and pressure loss.
Figure 23:
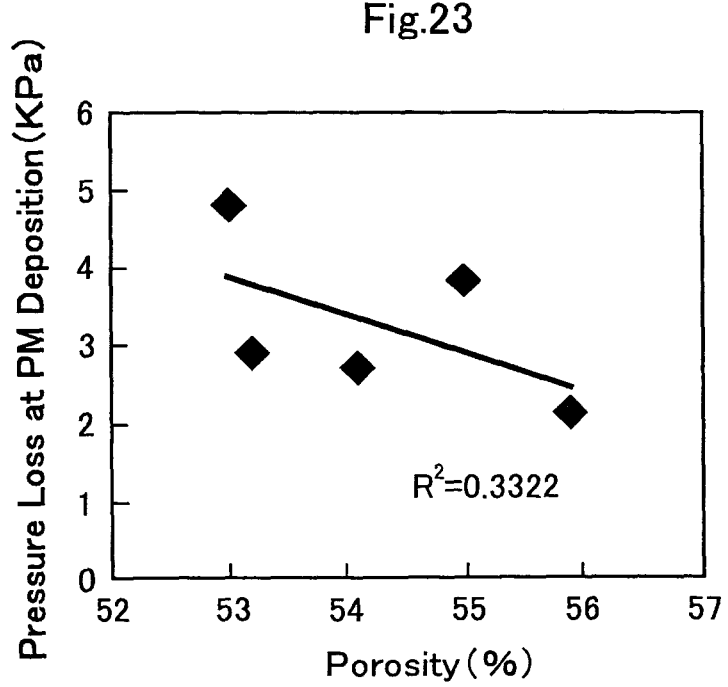
FIG. 23 is a graph for illustrating the relationship between catalytic layer's porosity and pressure loss.

Further, the relationships between the pressure loss and each of the average particle diameter, porosity and uniformity are illustrated in FIGS. 21 through 23.

From FIG. 21, it is understood that the uniformity of the catalytic layers, which is expressed by (the number of the outer-periphery contour-portion pixels)/(the number of the catalytic-layer pixels), and the pressure loss exhibits a high correlation. On the contrary, no correlation is seen between the average pore diameter and the pressure loss, illustrated in FIG. 22, and between the porosity and the pressure loss, illustrated in FIG. 23.

As described above, the filter catalysts of the respective examples are such that the rise of the pressure loss is suppressed low even when particulates deposit thereon. That is, they become filter catalysts which are less load with respect to engines.

The invention claimed is:

1. A filter catalyst comprising: a catalyst-support substrate comprising a heat-resistant porous structure having chained pores; and a catalytic layer for burning particulates, the catalytic layer formed on a surface of the catalyst-support substrate; the filter catalyst being characterized in that an SEM photograph on a cross section of the filter catalyst is turned into electronic data so that, in an image being turned into electronic data, a ratio of a number of pixels forming an outer periphery of the catalytic layer to a number of pixels forming the catalytic layer is 0.5 or more; wherein: forming the catalytic layer comprises removing excess oxide slurry by repeating a pressure fluctuation at both ends of the catalyst-support substrate; and particles forming the oxide slurry having a diameter of 1 μm or less are present in an amount of 70% or more by weight of an entire amount of particles forming the oxide slurry.

2. A method of analyzing a catalytic layer of a filter catalyst comprising: comprising turning an SEM photograph on a cross section of the filter catalyst into electronic data so that, in an image being turned into electronic data, a coated state is analyzed from a ratio of a number of pixels forming an outer periphery of the catalytic layer to a number of pixels forming the catalytic layer; wherein the filter catalyst comprises: a catalyst-support substrate comprising a heat-resistant porous structure having chained pores; and a catalytic layer for burning particulates, the catalytic layer formed on a surface of the catalyst-support substrate, wherein: forming the catalytic layer comprises removing excess oxide slurry by repeating a pressure fluctuation at both ends of the catalyst-support substrate, and particles forming the oxide slurry having a diameter of 1 μm or less are present in an amount of 70% or more by weight of an entire amount of particles forming the oxide slurry.

3. The filter catalyst set forth in claim 1, wherein the catalytic layer is formed in a loading amount of 150 g/1-liter to 200 g/1-liter apparent volume of the catalyst-support substrate.

4. The filter catalyst set forth in claim 1, wherein the diameter of the particles forming the slurry is 1 μm or less.

5. A method of analyzing a catalytic layer of a filter catalyst comprising turning an SEM photograph on a cross section of the filter catalyst into electronic data so that, in an image being turned into electronic data, a coated state is analyzed from a ratio of a number of pixels forming an outer periphery of the catalytic layer to a number of pixels forming the catalytic layer;

wherein the filter catalyst comprises:
a catalyst-support substrate of comprising a heat-resistant porous structure having chained pores; and
a catalytic layer for burning particulates, the catalytic layer formed on a surface of the catalyst-support substrate, wherein:

forming the catalytic layer comprises removing excess slurry by repeating a pressure fluctuation at both ends of the catalyst-support substrate, and particles forming the slurry having a diameter of 1 μm or less are present in an amount of 70% or more by weight of an entire amount of particles forming the slurry.

6. The method of analyzing a catalytic layer of a filter catalyst set forth in claim 5, wherein said image being turned into the electronic data is an image with 1-to-3-μm/pixel magnification.

7. The method of analyzing a catalytic layer of a filter catalyst set forth in claim 5, wherein the catalytic layer is formed in a loading amount of 150 g/1-liter to 200 g/1-liter apparent volume of the catalyst-support substrate.

8. A filter catalyst comprising: a catalyst-support substrate comprising a heat-resistant porous structure having chained pores; and a catalytic layer for burning particulates, the catalytic layer formed on a surface of the catalyst-support substrate; wherein: a ratio of an outer peripheral length of the catalytic layer in the cross section of the filter catalyst to a cross-sectional area of the catalytic layer is 0.5 or more; forming the catalytic layer comprises removing excess oxide slurry by repeating a pressure fluctuation at both ends of the catalyst-support substrate, substrate; and particles forming the oxide slurry having a diameter of 1 μm or less are present in an amount of 70% or more by weight of an entire amount of particles forming the oxide slurry.

* * * * *

UNITED STATES PATENT AND TRADEMARK OFFICE
CERTIFICATE OF CORRECTION

PATENT NO. : 8,465,703 B2
APPLICATION NO. : 10/568429
DATED : June 18, 2013
INVENTOR(S) : Makoto Tsuji et al.

It is certified that error appears in the above-identified patent and that said Letters Patent is hereby corrected as shown below:

In the Claims

Columns 12-13, Line 16-67 & Line 1-29, claims 1-8, please replace claims 1-8 as follows:

1. A filter catalyst comprising:
a catalyst-support substrate comprising a heat-resistant porous structure having chained pores; and
a catalytic layer for burning particulates, the catalytic layer formed on a surface of the catalyst-support substrate;
the filter catalyst being characterized in that an SEM photograph on a cross section of the filter catalyst is turned into electronic data so that, in an image being turned into electronic data, a ratio of a number of pixels forming an outer periphery of the catalytic layer to a number of pixels forming the catalytic layer is 0.5 or more;
wherein:
forming the catalytic layer comprises removing excess oxide slurry by repeating a pressure fluctuation at both ends of the catalyst-support substrate; and
particles forming the oxide slurry having a diameter of 1 μm or less are present in an amount of 70% or more by weight of an entire amount of particles forming the oxide slurry.
2. The filter catalyst set forth in claim 1, wherein said image being turned into the electronic data is an image with 1-to-3-μm/pixel magnification.
3. A method of analyzing a catalytic layer of a filter catalyst comprising turning an SEM photograph on a cross section of the filter catalyst into electronic data so that, in an image being turned into electronic data, a coated state is analyzed from a ratio of a number of pixels forming an outer periphery of the catalytic layer to a number of pixels forming the catalytic layer;
wherein the filter catalyst comprises:
a catalyst-support substrate comprising a heat-resistant porous structure having chained pores; and
a catalytic layer for burning particulates, the catalytic layer formed on a surface of the catalyst-support substrate, wherein:

Signed and Sealed this
Eighth Day of October, 2013

Teresa Stanek Rea
*Deputy Director of the United States Patent and Trademark Office* forming the catalytic layer comprises removing excess oxide slurry by repeating a pressure fluctuation at both ends of the catalyst-support substrate, and particles forming the oxide slurry having a diameter of 1 μm or less are present in an amount of 70% or more by weight of an entire amount of particles forming the oxide slurry.

4. The method of analyzing a catalytic layer of a filter catalyst set forth in claim 3, wherein said image being turned into the electronic data is an image with 1-to-3-μm/pixel magnification.

5. The filter catalyst set forth in claim 1, wherein the catalytic layer is formed in a loading amount of 150g/l-liter to 200g/l-liter apparent volume of the catalyst-support substrate.

6. The method of analyzing a catalytic layer of a filter catalyst set forth in claim 3, wherein the catalytic layer is formed in a loading amount of 150g/l-liter to 200g/l-liter apparent volume of the catalyst-support substrate.

7. A filter catalyst comprising:

a catalyst-support substrate comprising a heat-resistant porous structure having chained pores; and a catalytic layer for burning particulates, the catalytic layer formed on a surface of the catalyst-support substrate;

wherein:

a ratio of an outer peripheral length of the catalytic layer in the cross section of the filter catalyst to a cross-sectional area of the catalytic layer is 0.5 or more;

forming the catalytic layer comprises removing excess oxide slurry by repeating a pressure fluctuation at both ends of the catalyst-support substrate; and particles forming the oxide slurry having a diameter of 1 μm or less are present in an amount of 70% or more by weight of an entire amount of particles forming the oxide slurry.

8. The filter catalyst set forth in claim 1, wherein the diameter of the particles forming the oxide slurry is 1 μm or less.